United States Patent
Toyota et al.

(10) Patent No.: US 6,902,685 B2
(45) Date of Patent: Jun. 7, 2005

(54) OXIDE MAGNETIC MATERIAL

(75) Inventors: Sachio Toyota, Saga (JP); Isamu Furuchi, Shimamoto-cho (JP); Yoshinori Kobayashi, Ibaraki (JP)

(73) Assignee: Neomax Co., Ltd., Osaka (JP)

( * ) Notice: Subject to any disclaimer, the term of this patent is extended or adjusted under 35 U.S.C. 154(b) by 0 days.

(21) Appl. No.: 10/381,133

(22) PCT Filed: May 21, 2002

(86) PCT No.: PCT/JP02/04922

§ 371 (c)(1),
(2), (4) Date: Mar. 24, 2003

(87) PCT Pub. No.: WO02/095772

PCT Pub. Date: Nov. 28, 2002

(65) Prior Publication Data

US 2004/0026654 A1 Feb. 12, 2004

(30) Foreign Application Priority Data

May 24, 2001 (JP) ..................... 2001-156085

(51) Int. Cl.[7] .................................. H01F 1/11
(52) U.S. Cl. ................ 252/62.63; 252/62.62; 252/62.58; 252/62.57
(58) Field of Search ............... 252/62.63, 62.62, 252/62.58, 62.57

(56) References Cited

U.S. PATENT DOCUMENTS 5,846,449 A   12/1998  Taguchi et al.
6,139,766 A * 10/2000  Taguchi et al. .......... 252/62.57

FOREIGN PATENT DOCUMENTS

| EP | 303151 | * 2/1989 |
|---|---|---|
| JP | 63-186402 | 8/1988 |
| JP | 1-283802 | 11/1989 |
| JP | 5-275221 | 10/1993 |
| JP | 10-149910 | 6/1998 |
| JP | 11-307331 | 11/1999 |
| JP | 2001-76919 | 3/2001 |
| JP | 2001-076919 | 3/2001 |
| JP | 2001-110618 | 4/2001 |

OTHER PUBLICATIONS

You–wei Du et al.: "Magnetic Properties and High Temperature Composition of the La, Ba $_{(1-x)}$ Fe $_{(12-x)}$ Zn$_x$O $_{19}$ Ferrites"; Journal of Magnetism and Magnetic Materials; vol. 31–34 (1983); pp. 793–794; Department of Physics, Nanjing University, Nanjing, China.

G.A. Smolenskii and A.A. Andreev: "Investigation of Ferrimagnets with the Structure of Magnetoplumbite and Garnet in Strong Pulse Magnetic Fields"; Bulletin Of The Academy Of Scienced Of The USSR; Physical Series, vol. 25, No. 11 (1961), pp. 1405–1408.

* cited by examiner

*Primary Examiner*—C. Melissa Koslow
(74) *Attorney, Agent, or Firm*—Keating & Bennett, LLP

(57) ABSTRACT

A ferrite magnet powder and a ferrite magnet exhibiting improved magnetic properties are provided at a reduced manufacturing cost. An application product and manufacturing methods thereof are also provided. An oxide magnetic material includes, as a main phase, a ferrite having a hexagonal M-type magnetoplumbite structure. The material includes: A, which is at least one element selected from the group consisting of Sr, Ba, Pb and Ca; R, which is at least one element selected from the group consisting of Y (yttrium), the rare earth elements and Bi; Fe; and B (boron). The constituents A, R, Fe and B of the material satisfy the inequalities of 7.04 at $\% \leq A \leq 8.68$ at %, 0.07 at $\% \leq R \leq 0.44$ at %, 90.4 at $\% \leq Fe \leq 92.5$ at % and 0.015 at $\% \leq B \leq 0.87$ at % to the sum of the elements A, R, Fe and B.

14 Claims, 8 Drawing Sheets

OXIDE MAGNETIC MATERIAL

TECHNICAL FIELD

The present invention relates to an oxide magnetic material, and more particularly relates to a ferrite magnet powder, a magnet made of the magnet powder, and methods of making the magnet powder and the magnet.

BACKGROUND ART

Ferrite is a generic term for any compound including an oxide of a divalent cationic metal and trivalent iron, and ferrite magnets have found a wide variety of applications in numerous types of rotating machines, loudspeakers, and so on. Typical materials for a ferrite magnet include Sr ferrites ($SrFe_{12}O_{19}$) and Ba ferrites ($BaFe_{12}O_{19}$) having a hexagonal magnetoplumbite structure. Each of these ferrites is made of iron oxide and a carbonate of strontium (Sr), barium (Ba) or any other suitable element, and can be produced at a relatively low cost by a powder metallurgical process.

A basic composition of an (M-type) ferrite having the magnetoplumbite structure is normally represented by the chemical formula $AO.6Fe_2O_3$, where A is a metal element to be divalent cationic and is selected from the group consisting of Sr, Ba, and other suitable elements.

It is known that the remanence $J_r$ of a Ba ferrite or an Sr ferrite can be increased by substituting a rare earth element such as La for a portion of Ba or a portion of Sr and by substituting Zn for a portion of Fe (see Journal of Magnetism and Magnetic Materials, Vols. 31–34 (1983), 793–794, Japanese Patent Application No. 8-145006 and Japanese Laid-Open Publication No. 9-115715).

It is also known that the coercivity $H_{cJ}$ and $J_r$ of a Ba ferrite or an Sr ferrite can be increased by substituting a rare earth element such as La for a portion of Ba or a portion of Sr and by substituting Co for a portion of Fe (see Bull. Acad. Sci. USSR (Tranl.) phys. Sec. vol. 25 (1961) 1405–1408, Japanese Patent Application No. 8-306072 and Japanese Laid-Open Publication No. 10-149910).

As for an Sr ferrite, it was also reported that $H_{cJ}$ and $J_r$ thereof can be increased by substituting La for a portion of Sr and by substituting Co and Zn for a portion of Fe (see PCT International Application No. PCT/JP98/00764 (corresponding to PCT International Publication No. WO 98/38654).

Meanwhile, it was also proposed that La and Co, which are rather expensive materials, be added in small amounts to an Sr ferrite. For example, Japanese Laid-Open Publication No. 11-307331 reports that when 0.05 mol or less of La, 0.05 mol or less of Co and Mn were added to an Sr ferrite, the loop squareness of the B—H curve thereof improved.

There was a report that the magnetic properties improved when 1.5 wt % to 4 wt % of $La_2O_3$, for example, was added (see Japanese Laid-Open Publication No. 1-283802).

It was further reported that when 0.05 wt % to 5 wt % of CaO, $SiO_2$, CoO, $Cr_2O_3$, $Al_2O_3$, SrO or BaO was added to a Ba ferrite or an Sr ferrite, the magnetic properties thereof improved (see Japanese Laid-Open Publication No. 5-42128 and Japanese Patent No. 2908631).

However, none of these ferrite magnets cannot improve the magnetic properties sufficiently and reduce the manufacturing cost significantly at the same time. Specifically, it was reported that if La was substituted for a portion of Ba or a portion of Sr and if Zn was substituted for a portion of Fe in a ferrite, the ferrite exhibited increased $J_r$. In that case, however, $H_{cJ}$ thereof decreased noticeably.

Also, it was reported that when La was substituted for a portion of Ba or a portion of Sr and when Co was substituted for a portion of Fe in a ferrite, the ferrite exhibited increased $H_{cJ}$. However, $J_r$ of the ferrite did not increase so much as in the ferrite in which La was substituted for a portion of Ba or a portion of Sr and in which Zn was substituted for a portion of Fe.

It was reported that the Sr ferrite exhibited increased $J_r$ and increased $H_{cJ}$ when La was substituted for a portion of Sr and when Co and Zn were substituted for a portion of Fe. However, such an Sr ferrite easily causes an excessive grain growth during the sintering process thereof and eventually has decreased $H_{cJ}$ often.

Furthermore, if a rare earth element (such as La) and Co are used in large amounts as substituents for a ferrite, then the material cost of such a ferrite increases adversely because the raw materials of these substituents are expensive. In that case, the essential feature of the ferrite magnet, which should be produced at a lower manufacturing cost than a rare earth magnet, for example, might be lost.

There is also a proposal that those expensive La and Co be added in small amounts. Nevertheless, if that La or Co added is as small as 0.05 mol or less, then neither $J_r$ nor $H_{cJ}$ can be increased significantly although $J_r$ and $H_{cJ}$ are two of the most important magnetic properties.

Furthermore, even if only $La_2O_3$ is added or if CaO, $SiO_2$, CoO, $Cr_2O_3$, $Al_2O_3$, SrO and/or BaO are added in combination, the magnetic properties improve just slightly.

To produce a ferrite at a low cost, the compaction process, which is normally a costly manufacturing processing step, needs to be carried out in a short time. A dehydration process accounts for most of the compaction process time. To shorten the time it takes to carry out this dehydration process, a powder needs to be finely pulverized into particles with a relatively large size in a fine pulverization process, which should be performed before the compaction process. However, if the size of those fine particles is increased, then $J_r$ and $H_{cJ}$ decrease.

Furthermore, the degree of alignment and the density of a powder should be raised to increase $J_r$. In particular, the density may be increased if the powder is sintered at an elevated temperature. However, the high-temperature sintering process may cause an excessive grain growth and decreased $H_{cJ}$.

In order to overcome the problems described above, a primary object of the present invention is to provide a ferrite magnet that can be produced at a low manufacturing cost and that can still exhibit improved magnetic properties and a method of making such a ferrite magnet. A more specific object is to minimize the decrease in coercivity even when the sintering process is carried out at an elevated temperature.

DISCLOSURE OF INVENTION

These objects are achieved by any of the following subject matters (1) through (15):

(1) An oxide magnetic material including, as a main phase, a ferrite having a hexagonal M-type magnetoplumbite structure, the material comprising:

A, which is at least one element that is selected from the group consisting of Sr, Ba, Pb and Ca;

R, which is at least one element that is selected from the group consisting of Y (yttrium), the rare earth elements and Bi;

Fe; and

B (boron),
wherein the constituents A, R, Fe and B of the oxide magnetic material satisfy the inequalities of:
7.04 at %≦A≦8.68 at %;
0.07 at %≦R≦0.44 at %;
90.4 at %≦Fe≦92.5 at %; and
0.015 at %≦B≦0.87 at %
to the sum of the elements A, R, Fe and B.

(2) The oxide magnetic material of (1), wherein the material is represented by the general formula $$(1-x)AO \cdot (x/2)R_2O_3 \cdot n(Fe_2O_3) \cdot y(B_2O_3)$$

where 0.01≦x≦0.05, 0.001≦y≦0.05, and 5.2≦n≦6.2.

(3) A ferrite magnet powder including the oxide magnetic material of (1) or (2).

(4) A sintered magnet, which is made of the ferrite magnet powder of (3) and which includes CaO, SiO$_2$, CoO, Cr$_2$O$_3$, Al$_2$O$_3$, SrO and BaO at the percentages of:
0.3 wt % to 1.5 wt % (CaO),
0.2 wt % to 1.0 wt % (SiO$_2$),
0 wt % to 0.4 wt % (CoO),
0 wt % to 5.0 wt % (Cr$_2$O$_3$),
0 wt % to 5.0 wt % (Al$_2$O$_3$),
0 wt % to 3.0 wt % (SrO), and
0 wt % to 3.0 wt % (BaO), respectively.

(5) A method of making a ferrite calcined body, the method comprising the steps of
preparing a material powder mixture by mixing: a material powder of at least one compound that is selected from the group consisting of SrCO$_3$, BaCO$_3$, PbO and CaCO$_3$; a material powder of at least one oxide that is selected from the group consisting of an oxide of Y, oxides of the rare earth elements and Bi$_2$O$_3$; a material powder of Fe$_2$O$_3$ (iron oxide); and a material powder of B$_2$O$_3$ or H$_3$BO$_3$, and
calcining the material powder mixture at a temperature of 1,100° C. to 1,300° C., thereby forming a ferrite calcined body having a composition represented by the general formula:

$$(1-x)AO \cdot (x/2)R_2O_3 \cdot n(Fe_2O_3) \cdot y(B_2O_3)$$

where A is at least one element selected from the group consisting of Sr, Ba, Pb and Ca; R is at least one element selected from the group consisting of the rare earth elements, including Y, and Bi; 0.01≦x≦0.05; 0.001≦y≦0.05; and 5.2≦n≦6.2.

(6) The method of (5), comprising the step of preparing the material powder of Fe$_2$O$_3$ (iron oxide) having a particle size of 0.5 μm to 0.8 μm when the size is measured by an air permeability method.

(7) A method of making a magnet powder, the method comprising the steps of:
preparing a calcined body mixed powder by adding 0.3 wt % to 1.5 wt % of CaCO$_3$, 0.2 wt % to 1.0 wt % of SiO$_2$, 0 wt % to 0.4 wt % of CoO, 0 wt % to 0.4 wt % of cobalt hydroxide, 0 wt % to 5.0 wt % of Cr$_2$O$_3$, 0 wt % to 5.0 wt % of Al$_2$O$_3$, 0 wt % to 3.0 wt % of SrCO$_3$ and 0 wt % to 3.0 wt % of BaCO$_3$ to the calcined body that has been made by the method of (5) or (6); and
pulverizing the calcined body mixed powder to obtain a ferrite pulverized powder having a mean particle size of 0.5 μm to 1.5 μm when the size is measured by an air permeability method.

(8) The method of (7), comprising the step of obtaining the ferrite pulverized powder having a mean particle size of 0.8 μm to 1.3 μm when the size is measured by the air permeability method.

(9) A method of producing a sintered magnet, the method comprising the steps of:
preparing a material powder mixture by mixing: a material powder of at least one compound that is selected from the group consisting of SrCO$_3$, BaCO$_3$, PbO and CaCO$_3$; a material powder of at least one oxide that is selected from the group consisting of an oxide of Y, oxides of the rare earth elements and Bi$_2$O$_3$; a material powder of Fe$_2$O$_3$ (iron oxide); and a material powder of B$_2$O$_3$ or H$_3$BO$_3$;
calcining the material powder mixture at a temperature of 1,100° C. to 1,300° C., thereby forming a ferrite calcined body having a composition represented by the general formula: (1-x)AO·(x/2)R$_2$O$_3$·n(Fe$_2$O$_3$)·y(B$_2$O$_3$) where A is at least one element selected from the group consisting of Sr, Ba, Pb and Ca; R is at least one element selected from the group consisting of the rare earth elements, including Y, and Bi; 0.01≦x≦0.05; 0.001≦y≦0.05; and 5.2≦n≦6.2;
preparing a calcined body mixed powder by adding 0.3 wt % to 1.5 wt % of CaCO$_3$, 0.2 wt % to 1.0 wt % of SiO$_2$, 0 wt % to 0.4 wt % of CoO, 0 wt % to 0.4 wt % of cobalt hydroxide, 0 wt % to 5.0 wt % of Cr$_2$O$_3$, 0 wt % to 5.0 wt % of Al$_2$O$_3$, 0 wt % to 3.0 wt % of SrCO$_3$ and 0 wt % to 3.0 wt % of BaCO$_3$ to the ferrite calcined body;
pulverizing the calcined body mixed powder in an aqueous solvent, thereby obtaining a slurry of a ferrite pulverized powder having a mean particle size of 0.5 μm to 1.5 μm when the size is measured by an air permeability method; and
condensing, mulling, compacting and sintering the slurry, where the slurry is compacted with or without a magnetic field applied thereto.

(10) The method of (9), wherein the step of pulverizing or the step of mulling includes the step of adding a dispersant at a solid matter ratio of 0.1 wt % to 2.0 wt %.

(11) The method of (9) or (10), wherein the step of sintering is carried out at a temperature of 1,230° C. or more.

(12) A sintered magnet produced by the method of one of (9) to (11).

(13) A sintered magnet that is produced by the method of one of (9) to (11) and that has a density of 5.02 Mg/m$^3$ or more.

(14) A sintered magnet that is produced by the method of one of (9) to (11) and that has a loop squareness of 95% or more.

(15) A rotating machine comprising the sintered magnet of one of (4), (12), (13) and (14).

BEST MODE FOR CARRYING OUT THE INVENTION

According to the present invention, element La is substituted for a portion of element A in a ferrite having a hexagonal M-type magnetoplumbite structure AO.6Fe$_2$O$_3$ (where A is at least one element selected from the group consisting of Sr, Ba, Pb and Ca) and B (boron) is added thereto.

To obtain an M-type ferrite sintered magnet having a high magnetization $J_r$, it is necessary to increase the density and the degree of alignment of the sintered body thereof. As used herein, the "alignment" means aligning the crystallographic orientations of respective crystal grains in a polycrystalline structure. However, if the sintering temperature is raised to increase the density of the sintered magnet, then grain growth advances noticeably to decrease the coercivity $H_{cJ}$. This is because an M-type ferrite makes a pinning type magnet. In such a magnet, the greater the crystal grain size, the lower the coercivity. Furthermore, to increase the degree of alignment of a powder in a magnetic field, an increased aligning magnetic field needs to be applied while the powder is being compacted. However, if the aligning magnetic field should be increased, then the size of presses needs to be increased, thus increasing the manufacturing cost. In that case, the ferrite magnet cannot be produced at a low cost. That is to say, the major advantage of the ferrite magnet is sacrificed.

The present inventors discovered that if La is substituted for a portion of Sr, Ba, Pb or Ca in a ferrite having a hexagonal M-type magnetoplumbite structure, if B is added thereto, and if the percentages of those additives and the manufacturing conditions thereof are adjusted appropriately, then even a high sintering temperature still results in just slight decrease in coercivity $H_{cJ}$ and sufficient increase in density and magnetization $J_r$. This is the basic idea of the present invention.

The present inventors discovered and confirmed via experiments that if only one of La and B was added, the magnetic properties did not improve but that only when La and B were both added in appropriate amounts, even a high-temperature sintering process resulted in almost no decrease in coercivity. In the prior art, B has been regarded as one of additives that promote the grain growth during the sintering process. Accordingly, those skilled in the art have naturally expected that the additive B should decrease the coercivity. However, when both of La and B were added in appropriate amounts, the coercivity hardly decreased against those expectations but the magnetization rather increased.

An oxide magnetic material according to the present invention is a ferrite having a substantially magnetoplumbite structure, which is represented by (1−x) AO.(x/2)R$_2$O$_3$.n(Fe$_2$O$_3$).y(B$_2$O$_3$), where A is at least one element that is selected from the group consisting of Sr, Ba, Pb and Ca. If Sr is selected as A, then the magnetic properties improve more significantly than the situation where Ba, Pb or Ca is selected as A. Accordingly, Sr is preferably selected as A. However, Ba, Pb or Ca would be more advantageous than Sr depending on the specific application, because the cost would be lower in that case. R is at least one element that is selected from the group consisting of the rare earth elements, including Y, and Bi. Among other things, La is preferably selected as R because the magnetic properties improve most significantly in that case. However, depending on the specific application, any other element may be selected from that group to reduce the cost.

In the general formula described above, x, y and n represent mole fractions and are preferably satisfy $0.01 \leq x \leq 0.05$, $0.001 \leq y \leq 0.05$, and $5.2 \leq n \leq 6.2$, respectively.

More preferably, x and y satisfy $0.02 \leq x \leq 0.04$ and $0.005 \leq y \leq 0.03$, respectively. The mole fraction n preferably satisfies $5.2 \leq n \leq 6.2$ and more preferably satisfies $5.7 \leq n \leq 6.1$.

In this composition, if x or y is out of its preferred range, then a sintering process at a high temperature (e.g., in the range of 1,240° C. to 1,260° C.) would advance the grain growth noticeably, thus decreasing the coercivity $H_{cJ}$. On the other hand, if the sintering temperature is lowered to avoid that decrease, then the sintered density would decrease and the magnetization $J_r$ thereof would drop. If n is out of the range specified above, a different phase would appear to deteriorate the magnetic properties.

In the ferrite represented by the general formula, the percentages of the constituents A, R, Fe and B to the sum of these elements preferably satisfy 7.04 at %≤A≤8.68 at %, 0.07 at %≤R≤0.44 at %, 90.4 at %≤Fe≤92.5 at %, and 0.015 at %≤B≤0.87 at %, respectively.

After the ferrite has been calcined and while the calcined body is being finely pulverized, the following additives are preferably added in the following amounts:

0.3 wt % to 1.5 wt % of CaO;

0.2 wt % to 1.0 wt % of SiO$_2$;

0 wt % to 0.4 wt % of CoO;

0 wt % to 0.4 wt % of cobalt hydroxide;

0 wt % to 5.0 wt % of $Cr_2O_3$;
0 wt % to 5.0 wt % of $Al_2O_3$;
0 wt % to 3.0 wt % of $SrCO_3$; and
0 wt % to 3.0 wt % of $BaCO_3$,
where CoO may be replaced with $Co_3O_4$.

Next, an exemplary method of making a magnet powder according to the present invention will be described.

First, a powder of at least one compound that is selected from the group consisting of $SrCO_3$, $BaCO_3$, PbO and $CaCO_3$, a powder of $Fe_2O_3$, an oxide powder of at least one element (which will be referred to herein as an "element R") that is selected from the group consisting of Y (yttrium), the rare earth elements and Bi, and a powder of $H_3BO_3$ or $B_2O_3$ are mixed together.

The element R may be added as an oxide powder of any of those elements. Alternatively, the element R may also be added as a powder or a solution of a compound that will be oxidized in the subsequent calcining process (e.g., carbonates, hydroxides, nitrates and chlorides). As another alternative, a compound, including at least two elements that are selected from the group consisting of Sr, Ba, Pb, Ca, the rare earth elements including Y, Bi, Co, Cu and Fe, may also be added.

If necessary, about 3 wt % or less of any other compound (e.g., a compound including Si, Ca, Pb, Al, Ga, Cr, Sn, In, Co, Ni, Ti, Mn, Cu, Ge, V, Nb, Zr, Li and/or Mo) may be added to the material powder mixture. Also, the material powder mixture may further include very small amounts of impurities such as inevitable components.

It should be noted that the process step of preparing a material powder mixture herein refers to not only a situation where such a material powder mixture is prepared from the beginning but also a situation where a material powder mixture, prepared by somebody else, is purchased and used and a situation where a material powder made by somebody else is added to the mixture.

Next, the material powder mixture is heated to a temperature of 1,100° C. to 1,300° C. by using a batch furnace, a continuous furnace, or a rotary kiln, for example, thereby producing a ferrite compound having an M-type magnetoplumbite structure through a solid-phase reaction. This process will be referred to herein as "calcining" and a compound obtained by this process will be referred to herein as a "calcined body". The calcining process may be carried out for a period of time of about 1 second to about 10 hours, preferably from 0.1 hour to 3 hours.

In the calcining process, as the temperature rises, a ferrite phase is gradually formed through the solid phase reaction. The formation of the ferrite phase is completed at about 1,100° C. If the calcining process is finished at a temperature lower than about 1,100° C., then unreacted hematite will be left to deteriorate the resultant magnetic properties. The effects of the present invention are achieved if the calcining temperature exceeds 1,100° C. However, the effects of the present invention are relatively modest if the calcining temperature is in the range of 1,100° C. to 1,150° C., but increases as the calcining temperature exceeds this range. However, if the calcining temperature is higher than 1,300° C., then various inconveniences might be created. For example, crystal grains might grow so much that it would take a lot of time to pulverize the powder in the subsequent pulverizing process step.

In view of these considerations, the calcining temperature is preferably in the range of 1,100° C. to 1,300° C., more preferably in the range of 1,150° C. to 1,250° C.

The calcined body obtained by any of these calcining processes is a ferrite having a substantially M-type magnetoplumbite structure.

By performing the pulverization process step of pulverizing and/or crushing the M-type magnetoplumbite ferrite calcined body, a ferrite magnet powder according to the present invention can be obtained. The mean particle size thereof is preferably in the range of 0.5 $\mu$m to 1.5 $\mu$m. If the powder is too fine, then it would take too much time to dehydrate the powder being wet-pressed, thus increasing the cost adversely. For that reason, the mean particle size is more preferably in the range of 0.6 $\mu$m to 1.5 $\mu$m. An even more preferable range of the mean particle size is 0.8 $\mu$m to 1.5 $\mu$m. These mean particle sizes were measured by an air permeability method (using an instrument "Model SS-100" produced by Shimadzu Corp).

Hereinafter, a method of producing a ferrite magnet according to the present invention will be described.

First, the calcined body of an M-type magnetoplumbite ferrite is prepared by the method described above. Next, to improve the magnetic properties, $CaCO_3$, $SiO_2$, CoO, cobalt hydroxide, $Cr_2O_3$, $Al_2O_3$, $SrCO_3$ and $BaCO_3$ (specifically, 0.3 wt % to 1.5 wt % of $CaCO_3$, 0.2 wt % to 1.0 wt % of $SiO_2$, 0 wt % to 0.4 wt % of CoO, 0 wt % to 5.0 wt % of $Cr_2O_3$, 0 wt % to 5.0 wt % of $Al_2O_3$, 0 wt % to 3.0 wt % of $SrCO_3$ and 0 wt % to 3.0 wt % of $BaCO_3$) are added to the calcined body. Thereafter, the calcined body is subjected to a fine pulverization process using a roller mill, a vibrating mill, a ball mill and/or an attritor so as to be pulverized into fine powder particles having a mean particle size of 0.5 $\mu$m to 1.5 $\mu$m as measured by the air permeability method. The fine powder particles more preferably have a mean particle size of 0.8 $\mu$m to 1.5 $\mu$m (as measured by the air permeability method), even more preferably 0.8 $\mu$m to 1.3 $\mu$m. The fine pulverization process is preferably carried out as a combination of dry pulverization (i.e., coarse pulverization to a size of greater than 1.6 $\mu$m) and wet pulverization (i.e., fine pulverization to a size of 1.6 $\mu$m or less).

In the fine pulverization process, 0 wt % to 0.4 wt % of cobalt hydroxide is preferably added to the calcined body to improve the magnetic properties.

The wet pulverization process may be carried out with an aqueous solvent such as water or any of various non-aqueous solvents. As a result of the wet pulverization process, slurry is produced as a mixture of the solvent and the powder of the calcined body. Any of various known dispersants or surfactants is preferably added to the slurry at a solid matter ratio of 0.1 wt % to 2.0 wt %.

Thereafter, the slurry is compacted with or without a magnetic field applied thereto, while the solvent is removed from the slurry. Alternatively, the slurry may be subjected to drying, crushing and granulating process steps, and then compacted with or without a magnetic field applied thereto.

After the compaction process, the compact is subjected to various known manufacturing processing steps including degreasing, sintering, machining, cleaning and testing to obtain a ferrite magnet as a final product. The sintering process may be carried out in the air at a temperature of 1,150° C. to 1,300° C. for 0.1 hour to 2 hours. If the fine powder particles have a mean particle size of 0.8 $\mu$m or more, the grain growth does not occur so easily even at an increased sintering temperature. For that reason, the sintering temperature is preferably 1,230° C. or more. More preferably, the sintering temperature is in the range of 1,230° C. to 1,260° C.

The sintered magnet to be obtained by the sintering process may have a mean particle size of 0.7 $\mu$m to 2.0 $\mu$m, for example.

A rotating machine according to the present invention is characterized by including a ferrite magnet produced by the method described above. Thus, the specific structure thereof may be the same as that of a known rotating machine.

Hereinafter, the present invention will be described by way of illustrative examples.

EXAMPLE 1

First, various material powders, including an $SrCO_3$ powder, an $La_2O_3$ powder, an $Fe_2O_3$ powder (with a particle size of 0.6 μm) and an $H_3BO_3$ powder, were mixed together such that a composition $(1-x)SrO.(x/2)La_2O_3.n(Fe_2O_3).y(B_2O_3)$ would satisfy $0.00 \leq x \leq 0.1$, $0.000 \leq y \leq 0.15$ and $5.0 \leq n \leq 6.5$. Among other things, $H_3BO_3$ was added in a greater amount than finally needed because B (boron) would vaporize during the calcining and sintering processes. The resultant material powder mixture was pulverized with a wet ball mill for four hours, dried, and then sieved. Thereafter, the powder was calcined in the air at 1,200° C. for one hour, thereby obtaining a calcined body magnet powder.

Next, 0.8 wt % of a $CaCO_3$ powder, 0.6 wt % of an $SiO_2$ powder, 0.2 wt % of a $Co_3O_4$ powder, 0.3 wt % of $Cr_2O_3$, 0.03% of $Al_2O_3$ and 0.8 wt % of $SrCO_3$ were added to the calcined body magnet powder. Then, using water as a solvent, the mixture was finely pulverized with a wet ball mill to a mean particle size of 0.8 μm as measured by the air permeability method.

Thereafter, with the solvent removed from the finely pulverized slurry, the slurry was compacted within a magnetic field (of which the magnetizing direction was parallel to the pressing direction and which had a field strength of 13 kOe). The powder compact was sintered in the air at 1,220° C. for one hour to obtain a sintered magnet.

Figure 1:
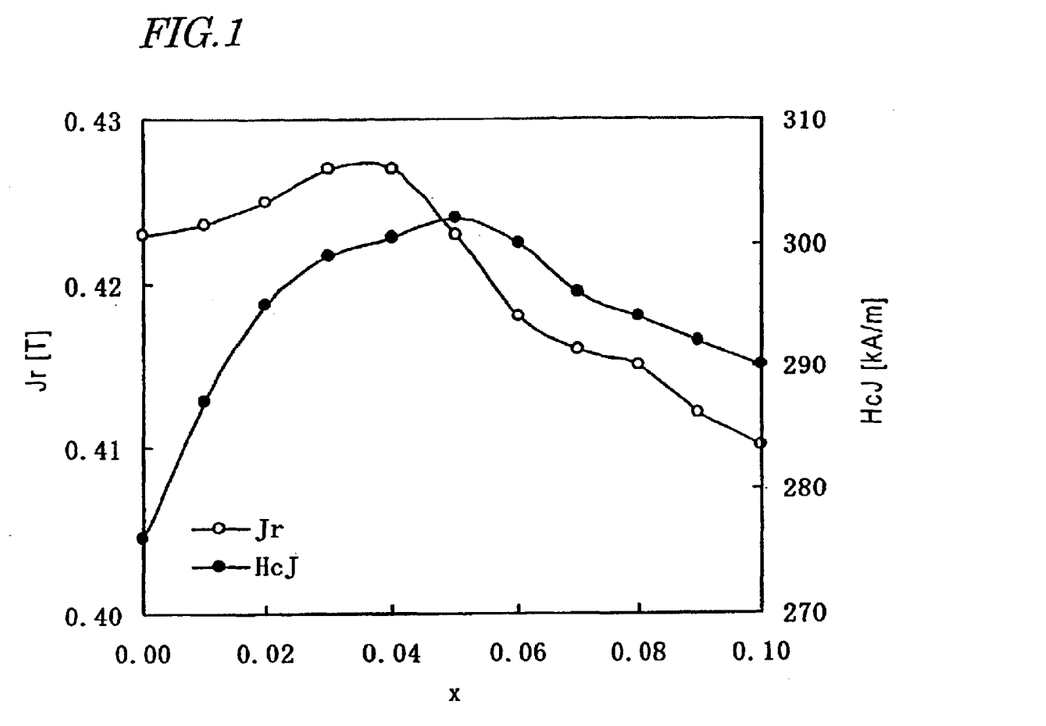
FIG. 1 is a graph showing a relationship between the remanence J$_r$ of a sintered magnet and x in a composition (1-x)SrO·(x/2)La$_2$O$_3$·n(Fe$_2$O$_3$)·y(B$_2$O$_3$) and a relationship between the coercivity H$_{cJ}$ of the magnet and x in a situation where y and n are fixed at 0.01 and 5.9, respectively, and x is changed in the range of 0 to 0.1.
Figure 2:
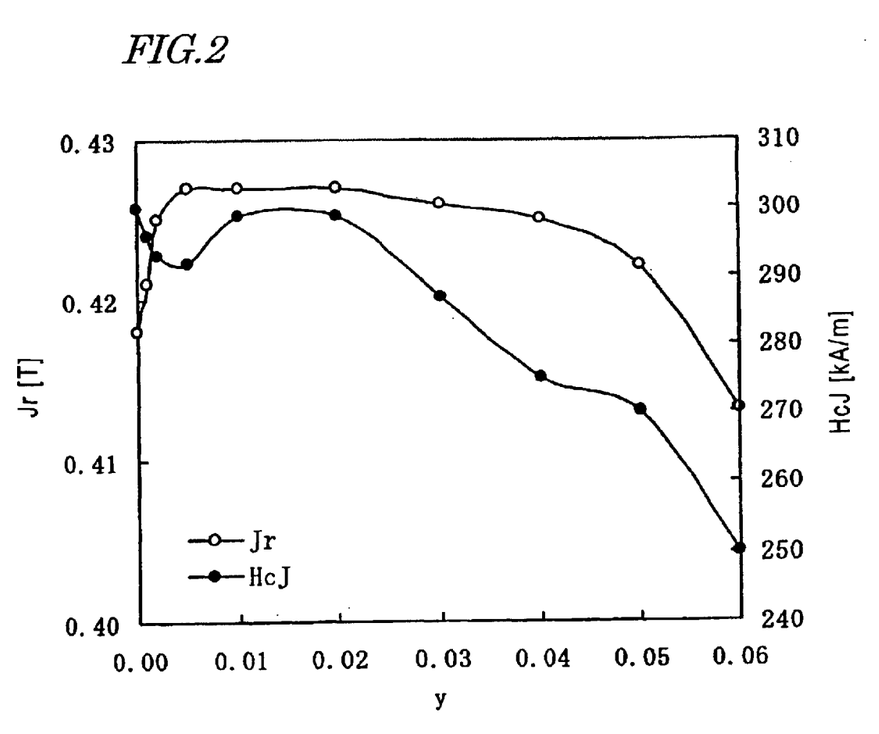
FIG. 2 is a graph showing a relationship between the remanence J$_r$ of a sintered magnet and y in a composition (1-x)SrO·(x/2)La$_2$O$_3$·n(Fe$_2$O$_3$)·y(B$_2$O$_3$) and a relationship between the coercivity H$_{cJ}$ of the magnet and y in a situation where x and n are fixed at 0.03 and 5.9, respectively, and y is changed in the range of 0 to 0.06.
Figure 3:
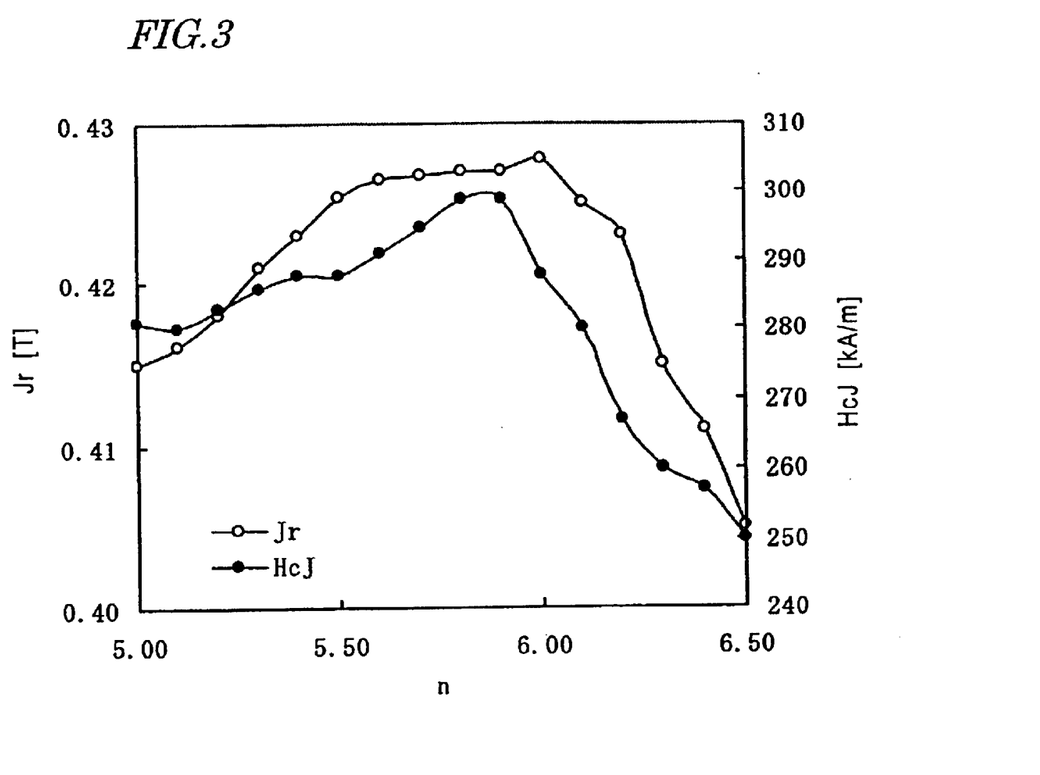
FIG. 3 is a graph showing a relationship between the remanence J$_r$ of a sintered magnet and n in a composition (1-x)SrO·(x/2)La$_2$O$_3$·n(Fe$_2$O$_3$)·y(B$_2$O$_3$) and a relationship between the coercivity H$_{cJ}$ of the magnet and n in a situation where x and y are fixed at 0.03 and 0.01, respectively, and n is changed in the range of 5.0 to 6.5.

The magnetization $J_r$ and coercivity $H_{cJ}$ of the resultant sintered magnet were measured. The results are shown in FIGS. 1 through 3. Approximately half of B vaporizes during the calcining and sintering processes. Thus, the y values were obtained by analyzing the sintered body.

FIG. 1 shows the results of measurement that were obtained when y and n were fixed at 0.01 and 5.9, respectively, and when x was changed in the range of 0 to 0.1. As is clear from FIG. 1, excellent properties were achieved when x was in the range of 0.01 to 0.05.

FIG. 2 shows the results of measurement that were obtained when x and n were fixed at 0.03 and 5.9, respectively, and when y was changed in the range of 0 to 0.15. As is clear from FIG. 2, excellent properties are achieved when y is in the range of 0.002 to 0.03. In this case, B is in the range of 0.03 at % to 0.50 at %. A more preferable y range is 0.004 to 0.02. In that case, B is in the range of 0.06 at % to 0.35 at %.

FIG. 3 shows the data that were obtained when x and y were fixed at 0.03 and 0.01, respectively, and when n was changed in the range of 5.0 to 6.5. As is clear from FIG. 3, excellent properties were achieved when n was in the range of 5.2 to 6.2.

EXAMPLE 2

Figure 4:
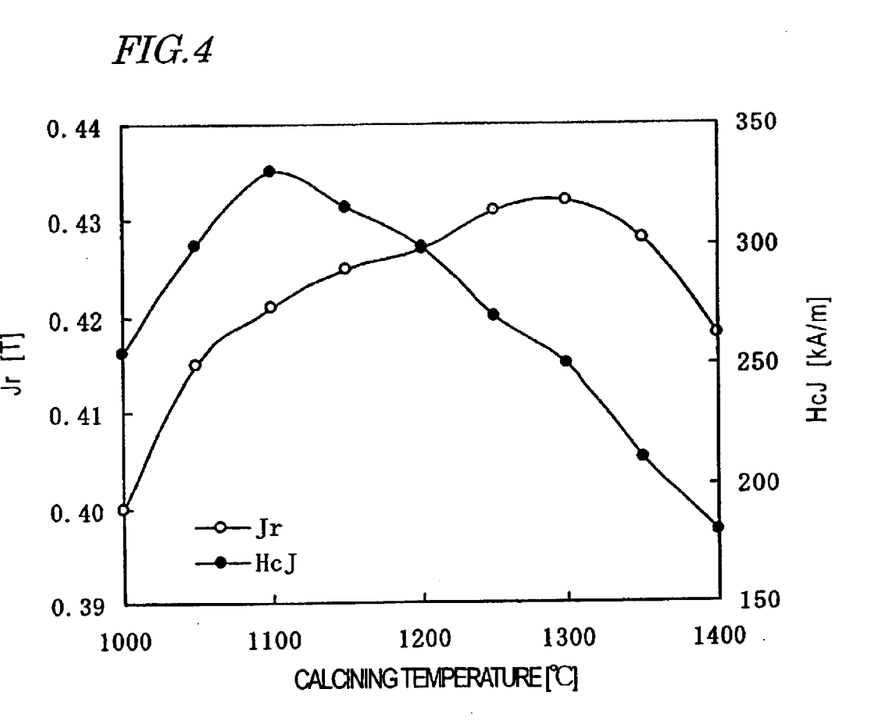
FIG. 4 is a graph showing a relationship between the calcining temperature and the remanence J$_r$ of a sintered magnet and a relationship between the calcining temperature and the coercivity $H_{cJ}$ of the magnet in a situation where x, y and n of a composition (1−x)SrO.(x/2)La$_2$O$_3$.n(Fe$_2$O$_3$).y(B$_2$O$_3$) are fixed at 0.03, 0.01 and 5.9, respectively.

A sintered body was obtained as in the first example described above except that the various material powders were mixed together such that the composition $(1-x)SrO.(x/2)La_2O_3.n(Fe_2O_3).y(B_2O_3)$ would satisfy x=0.3, y=0.01 (value obtained by analyzing the sintered body) and n=5.9 and that the calcining temperature was changed in the range of 1,000° C. to 1,400° C. The $J_r$ and $H_{cJ}$ values of the resultant sintered magnet were also measured. The results are shown in FIG. 4. As is clear from FIG. 4, excellent properties were achieved when the calcining temperature was in the range of 1,100° C. to 1,300° C. It can also be seen that both $J_r$ and $H_{cJ}$ were particularly high when the calcining temperature was in the range of 1,150° C. to 1,250° C.

EXAMPLE 3

Figure 5:
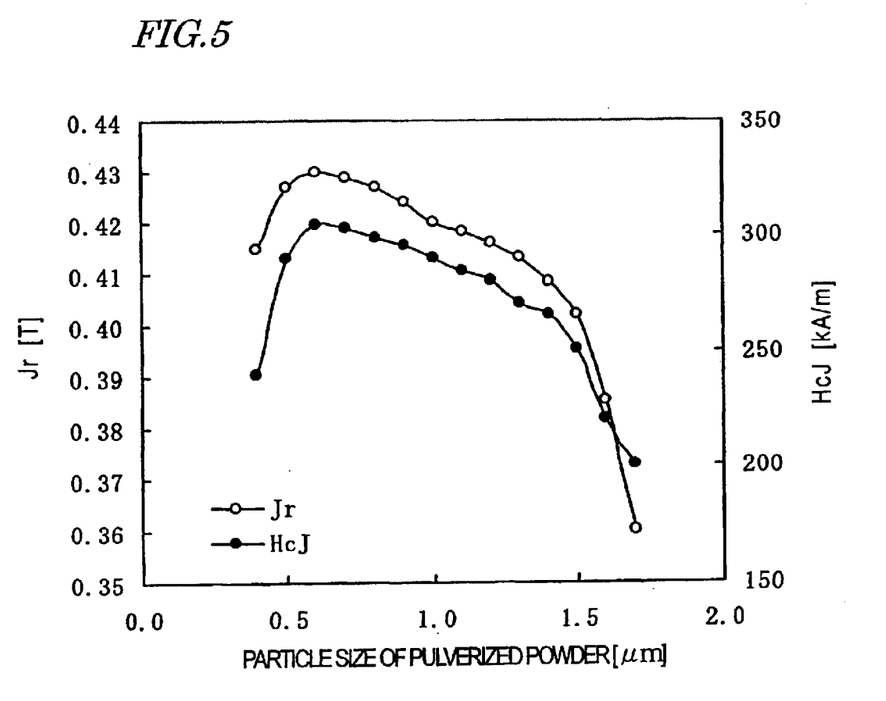
FIG. 5 is a graph showing a relationship between the particle size of a pulverized powder and the remanence $J_r$ of a sintered magnet and a relationship between the particle size of the pulverized powder and the coercivity $H_{cJ}$ of the magnet in a situation where x, y and n of a composition (1−x)SrO.(x/2)La$_2$O$_3$.n(Fe$_2$O$_3$).y(B$_2$O$_3$) are fixed at 0.03, 0.01 and 5.9, respectively.

A sintered body was obtained as in the first example described above except that the various material powders were mixed together such that the composition $(1-x)SrO.(x/2)La_2O_3.n(Fe_2O_3).y(B_2O_3)$ would satisfy x=0.03, y=0.01 (value obtained by analyzing the sintered body) and n=5.9 and that the particle size of the pulverized powder was changed in the range of 0.4 μm to 1.7 μm. The $J_r$ and $H_{cJ}$ values of the resultant sintered magnet were also measured. The results are shown in FIG. 5. As is clear from FIG. 5, excellent properties were achieved when the particle size of the pulverized powder was in the range of 0.6 μm to 1.5 μm.

The time that it takes to complete dehydration during the compaction process shortens steeply at a particle size of 0.8 μm or more. More specifically, if the particle size is 0.8 μm, the dehydration finishes in approximately a half amount of time compared to the situation where the particle size is 0.6 μm. Accordingly, by setting the particle size to 0.8 μm or more, the compaction cycle can be halved and the productivity can be doubled compared to the situation where the particle size is 0.6 μm. It can be seen that the particle size is preferably in the range of 0.8 μm to 1.5 g m, more preferably in the range of 0.8 μm to 1.3 μm, to improve the magnetic properties.

EXAMPLE 4

A sintered body was obtained as in the first example described above except that the various material powders were mixed together such that the composition $(1-x)SrO.(x/2)La_2O_3.n(Fe_2O_3).y(B_2O_3)$ would satisfy x=0.03, y=0.01 (value obtained by analyzing the sintered body) and n=5.9 and that cobalt hydroxide, as well as $Co_3O_4$ of the first example, was added as Co to the calcined body magnet powder. The cobalt hydroxide was added at the same Co mole fraction. The $J_r$ and $H_{cJ}$ values of the resultant sintered magnet were also measured. The results are shown in the following Table 1. As is clear from Table 1, higher magnetic properties were achieved by adding (divalent or trivalent) cobalt hydroxide compared to adding $Co_3O_4$.

TABLE 1

|  | $J_r$ (T) | $H_{cJ}$ (kA/m) |
|---|---|---|
| $Co_3O_4$ | 0.427 | 299 |
| Cobalt hydroxide (divalent) | 0.429 | 311 |
| Cobalt hydroxide (trivalent) | 0.430 | 315 |

EXAMPLE 5

Figure 6:
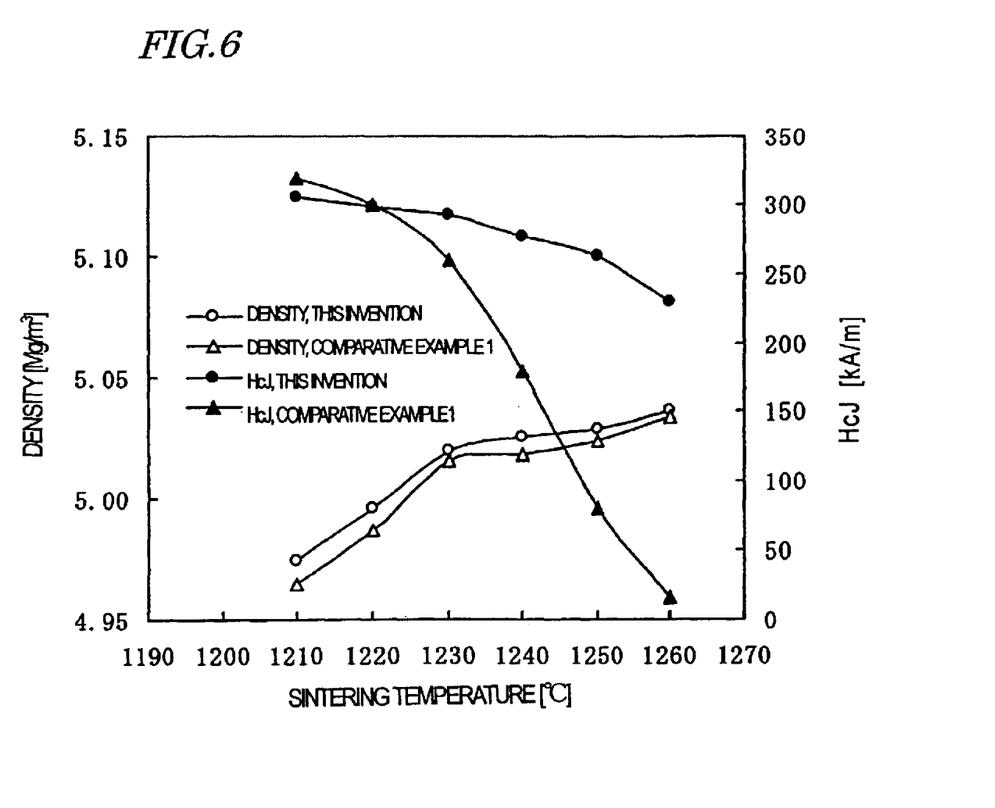
FIG. 6 is a graph showing relationships between the sintering temperature and the density of a sintered magnet and relationships between the sintering temperature and the coercivity $H_{cJ}$ of the magnet in two situations where x, y and n of a composition (1−x)SrO.(x/2)La$_2$O$_3$.n(Fe$_2$O$_3$).y(B$_2$O$_3$) are fixed at 0.03, 0.01 and 5.9 (the present invention) and at 0.00, 0.00 and 5.9 (comparative example 1), respectively.

A sintered body was obtained as in the first example described above except that the various material powders were mixed together such that the composition $(1-x)SrO.(x/2)La_2O_3.n(Fe_2O_3).y(B_2O_3)$ would satisfy x=0.03, y=0.01 (value obtained by analyzing the sintered body) and n=5.9 and that the sintering temperature was changed in the range of 1,200° C. to 1,260° C. The $J_r$ and $H_{cJ}$ values of the resultant sintered magnet were also measured. As a comparative sample (comparative example No. 1), another sintered body was obtained as in the first example described above except that the various material powders were mixed together such that the composition $(1-x)SrO\cdot(x/2)La_2O_3\cdot n(Fe_2O_3)\cdot y(B_2O_3)$ would satisfy x=0, y=0 and n=5.9 and that the sintering temperature was changed in the range of 1,200° C. to 1,260° C. As is clear from FIG. 6, according to the present invention, even if the sintering temperature was high, $H_{cJ}$ was also high and did not decrease so easily. It can also be seen that excellent properties were achieved particularly at 1,230° C. or more.

EXAMPLE 6

A sintered body was obtained as in the first example described above except that the various material powders were mixed together such that the composition $(1-x)SrO\cdot(x/2)La_2O_3\cdot n(Fe_2O_3)\cdot y(B_2O_3)$ would satisfy x=0.03, y=0.01 (value obtained by analyzing the sintered body) and n=5.9 and that the sintering temperature was changed in the range of 1,210° C. to 1,260° C. $H_k/H_{cJ}$ of the resultant sintered magnet was measured.

As a comparative example No. 2, another sintered body was obtained as in the first example described above except that the various material powders were mixed together such that the composition $(1-x)SrO\cdot(x/2)La_2O_3\cdot n(Fe_2O_3)\cdot y(B_2O_3)$ would satisfy x=0, y=0.01 (value obtained by analyzing the sintered body) and n=5.9 and that the sintering temperature was changed in the range of 1,210° C. to 1,260° C. $H_k/H_{cJ}$ of the resultant sintered magnet was also measured.

As a comparative example No. 3, another sintered body was obtained as in the first example described above except that the various material powders were mixed together such that the composition $(1-x)SrO\cdot(x/2)La_2O_3\cdot n(Fe_2O_3)\cdot y(B_2O_3)$ would satisfy x=0, y=0 and n=5.9 and that the sintering temperature was changed in the range of 1,210° C. to 1,260° C. $H_k/H_{cJ}$ of the resultant sintered magnet was also measured.

Figure 7:
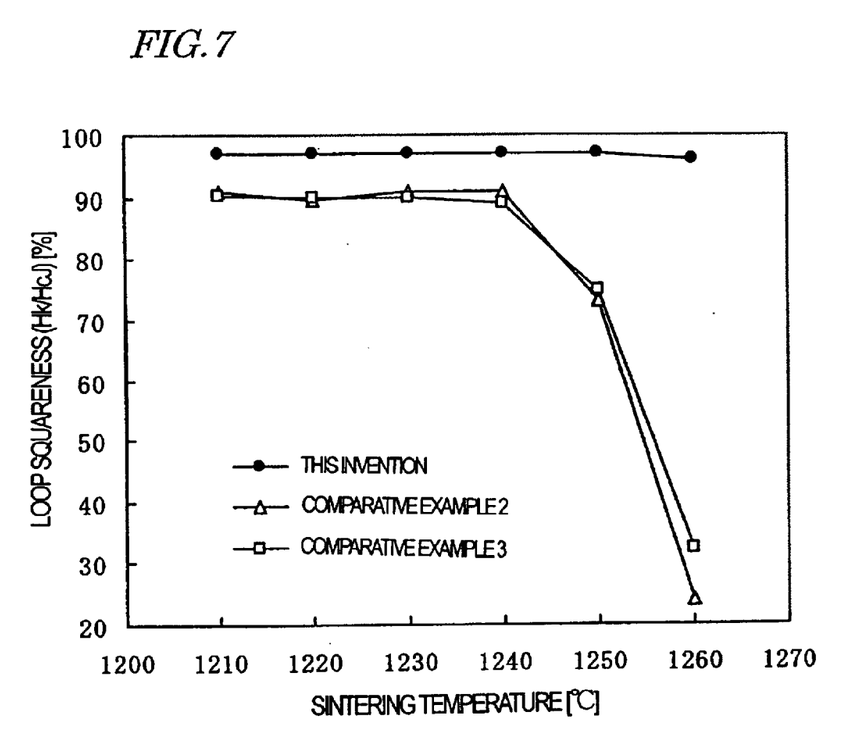
FIG. 7 is a graph showing relationships between the sintering temperature and the loop squareness $H_k/H_{cJ}$ of a sintered magnet in three situations where x, y and n of a composition (1−x)SrO.(x/2)La$_2$O$_3$.n(Fe$_2$O$_3$).y(B$_2$O$_3$) are fixed at 0.03, 0.01 and 5.9 (the present invention), at 0.00, 0.01 and 5.9 (comparative example 2), and at 0.00, 0.00 and 5.9 (comparative example 3), respectively.

As can be seen from FIG. 7, according to the present invention, even when the sintering temperature was high, the loop squareness of the demagnetization curve was also high. Also, a loop squareness of 95% or more was always obtained irrespective of the change in sintering temperature.

The loop squareness is represented as $H_k/H_{cJ}$ (%). As used herein, $H_k$ is a magnetic field at which the J value is 95% of the $J_r$ value as measured with a B—H tracer.

EXAMPLE 7

A sintered body was obtained as in the first example described above except that the various material powders were mixed together such that the composition $(1-x)SrO\cdot(x/2)La_2O_3\cdot n(Fe_2O_3)\cdot y(B_2O_3)$ would satisfy x=0.03, y=0.01 (value obtained by analyzing the sintered body) and n=5.9 and that 0.1 wt % of ammonium polycarbonate was selectively added as a dispersant. The $J_r$ and $H_{cJ}$ values of the resultant sintered magnet were measured.

TABLE 2

|  | $J_r$ (T) | $H_{cJ}$ (kA/m) |
| --- | --- | --- |
| Polycarbonate added | 0.432 | 286 |
| No polycarbonate added | 0.427 | 299 |

A C-shaped sintered magnet for use in motors was produced by the method described above and embedded in a motor instead of a sintered magnet made of the conventional material, and then the motor was operated under rated conditions. As a result, good characteristics were achieved. Also, the torque thereof was higher than that of the motor including the sintered magnet made of the conventional material.

EXAMPLE 8

A sintered body was obtained as in the first example described above except that the various material powders were mixed together such that the composition $(1-x)SrO\cdot(x/2)La_2O_3\cdot n(Fe_2O_3)\cdot y(B_2O_3)$ would satisfy x=0.03, y=0.01 (value obtained by analyzing the sintered body) and n=5.9 and that the material particle size of iron oxide was changed in the range of 0.4 μm to 5 μm. The $H_{cJ}$ of the resultant sintered magnet was measured.

Figure 8:
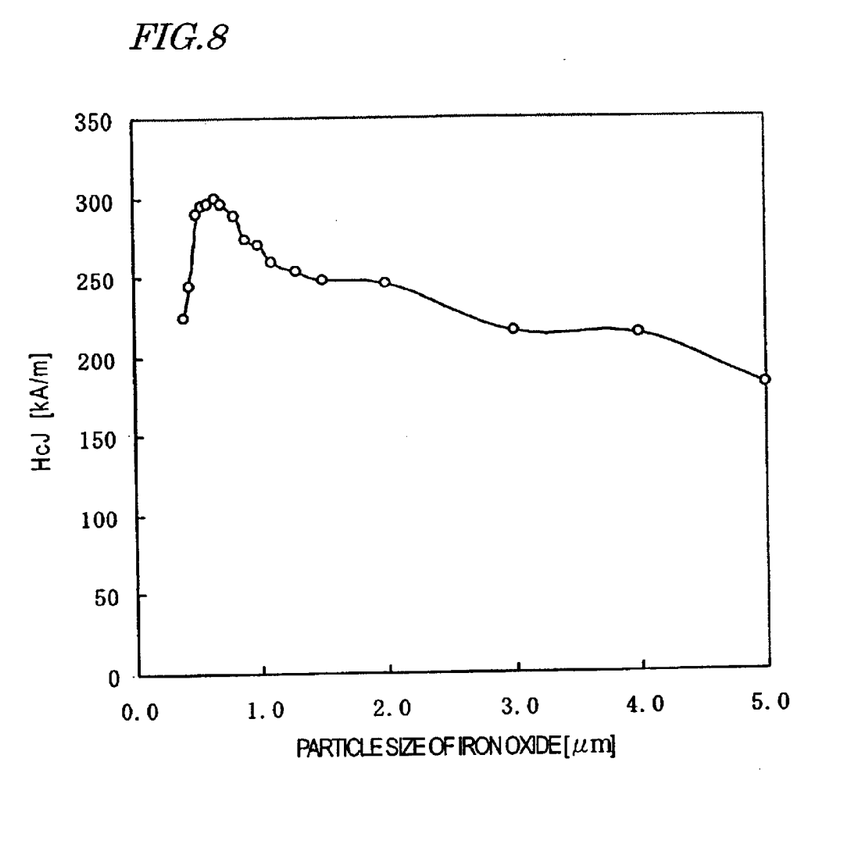
FIG. 8 is a graph showing a relationship between the material particle size of an iron oxide and $H_{cJ}$ of a sintered body in a situation where x, y and n of a composition (1−x)SrO.(x/2)La$_2$O$_3$.n(Fe$_2$O$_3$).y(B$_2$O$_3$) are fixed at 0.3, 0.01 (these values are obtained by analyzing the sintered body) and 5.9, respectively, and the material particle size of the iron oxide is changed in the range of 0.4 μm and 5 μm.

As is clear from FIG. 8, $H_{cJ}$ was high when the material particle size of iron oxide was in the range of 0.5 μm to 0.8 μm.

INDUSTRIAL APPLICABILITY

According to the present invention, La is substituted for a portion of Sr, Ba, Pb or Ca in a ferrite having a hexagonal M-type magnetoplumbite structure and an appropriate amount of B is added thereto. Then, even at a high sintering temperature, $H_{cJ}$ hardly decreases and a high density and a high magnetization are achieved. Also, by setting the particle size of the pulverized powder to 0.8 μm or more, the performance of the magnet can be improved and yet dehydration can be completed in a short time during the compaction process. Thus, a high-performance ferrite magnet can be provided at a low manufacturing cost.

What is claimed is:

1. An oxide magnetic material including, as a main phase, a ferrite having a hexagonal M-type magnetoplumbite structure, the material comprising:

A, which is at least one element that is selected from the group consisting of Sr, Ba, Pb and Ca;

R, which is at least one element that is selected from the group consisting of Y (yttrium), the rare earth elements and Bi;

Fe; and

B (boron), wherein the constituents A, R, Fe and B of the oxide magnetic material satisfy the inequalities of:

7.04 at %≦A≦8.68 at %;

0.07 at %≦R≦0.44 at %;

90.4 at %≦Fe≦92.5 at %; and 0.015 at %≦B≦0.87 at % with respect to the sum of the elements A, R, Fe and B; and wherein the material is represented by the general formula:

$$(1-x)AO\cdot(x/2)R_2O_3\cdot n(Fe_2O_3)\cdot y(B_2O_3)$$

where 0.01≦x≦0.05, 0.001≦y≦0.05, and 5.2≦n≦6.2.

2. A ferrite magnet powder including the oxide magnetic material of claim 1.

3. A sintered magnet, which is made of the ferrite magnet powder of claim 2 and which includes CaO, $SiO_2$, CoO, $Cr_2O_3$, $Al_2O_3$, SrO and BaO at the percentages of:

0.3 wt % to 1.5 wt % (CaO), 0.2 wt % to 1.0 wt % ($SiO_2$), 0 wt % to 0.4 wt % (CoO), 0 wt % to 5.0 wt % ($Cr_2O_3$), 0 wt % to 5.0 wt % ($Al_2O_3$), 0 wt % to 3.0 wt % (SrO), and 0 wt % to 3.0 wt% (BaO), respectively.

4. A method of making a ferrite calcined body, the method comprising the steps of:

preparing a material powder mixture by mixing:
a material powder of at least one compound that is selected from the group consisting of $SrCO_3$, $BaCO_3$, PbO and $CaCO_3$;
a material powder of at least one oxide that is selected from the group consisting of an oxide of Y, oxides of the rare earth elements and $Bi_2O_3$; a material powder of $Fe_2O_3$ (iron oxide); and
a material powder of $B_2O_3$ or $H_3BO_3$; and calcining the material powder mixture at a temperature of 1,100° C. to 1,300° C., thereby forming a ferrite calcined body having a composition represented by the general formula:

$$(1-x)AO \cdot (x/2)R_2O_3 \cdot n(Fe_2O_3) \cdot y(B_2O_3)$$

where A is at least one element selected from the group consisting of Sr, Ba, Pb and Ca; R is at least one element selected from the group consisting of the rare earth elements, including Y, and Bi; $0.01 \leq x \leq 0.05$; $0.001 \leq y \leq 0.05$; and $5.2 \leq n \leq 6.2$.

5. The method of claim 4, further comprising the step of preparing the material powder of $Fe_2O_3$ (Iron oxide) having a particle size of 0.5 μm to 0.8 μm when the size is measured by an air permeability method.

6. A method of making a magnet powder, the method comprising the steps of:

preparing a calcined body mixed powder by adding 0.3 wt % to 1.5 wt % of $CaCO_3$, 0.2 wt % to 1.0 wt % of $SiO_2$, 0 wt % to 0.4 wt % of CoO, 0 wt % to 0.4 wt % of cobalt hydroxide, 0 wt % to 5.0 wt % of $Cr_2O_3$, 0 wt % to 5.0 wt % of $Al_2O_3$, 0 wt % to 3.0 wt % of $SrCO_3$ and 0 wt % to 3.0 wt % of $BaCO_3$ to the calcined body that has been made by the method of claim 4; and pulverizing the calcined body mixed powder to obtain a ferrite pulverized powder having a mean particle size of 0.5 μm to 1.5 μm when the size is measured by an air permeability method.

7. The method of claim 6, further comprising the step of obtaining the ferrite pulverized powder having a mean particle size of 0.8 μm to 1.3 μm when the size is measured by the air permeability method.

8. A method of producing a sintered magnet, the method comprising the steps of:

preparing a material powder mixture by mixing:
a material powder of at least one compound that is selected from the group consisting of $SrCO_3$, $BaCO_3$, PbO and $CaCO_3$;
a material powder of at least one oxide that is selected from the group consisting of an oxide of Y, oxides of the rare earth elements and $Bi_2O_3$;
a material powder of $Fe_2O_3$ (iron oxide); and
a material powder of $B_2O_3$ or $H_3BO_3$; and calcinlng the material powder mixture at a temperature of 1,100° C. to 1.300° C., thereby forming a ferrite calcined body having a composition represented by the general formula:

$$(1-x)AO \cdot (x/2)R_2O_3 \cdot n(Fe_2O_3) \cdot y(B_2O_3)$$

where A is at least one element selected from the group consisting of Sr, Ba, Pb and Ca; R is at least one element selected from the group consisting of the rare earth elements, including Y, and Bi; $0.01 \leq x \leq 0.05$; $0.001 \leq y \leq 0.05$; and $5.2 \leq n \leq 6.2$;

preparing a calcined body mixed powder by adding 0.3 wt % to 1.5 wt % of $CaCO_3$, 0.2 wt % to 1.0 wt % of $SIO_2$, 0 wt % to 4.0 wt % of CoO, 0 wt % to 0.4 wt % of cobalt hydroxide, 0 wt % to 5.0 wt % of $Cr_2O_3$, 0 wt % to 5.0 wt % of $Al_2O_3$, 0 wt % to 3.0 wt % of $SrCO_3$ and 0 wt % to 3.0 wt % of $BaCO_3$ to the ferrite calcined body;

pulverizing the calcined body mixed powder in an aqueous solvent, thereby obtaining a slurry of a ferrite pulverized powder having a mean particle size of 0.5 μm to 1.5 μm when the size is measured by an air permeability method; and condensing, mulling, compacting and sintering the slurry, where the slurry is compacted with or without a magnetic field applied thereto.

9. The method of claim 8, wherein the step of pulverizing or the step of mulling includes the step of adding a dispersant at a solid matter ratio of 0.1 wt % to 2.0 wt %.

10. The method of claim 8, wherein the step of sintering is carried out at a temperature of 1,230° C. or more.

11. A sintered magnet produced by the method of claim 8.

12. A sintered magnet that is produced by the method of claim 8 and that has a density of 5.02 Mg/m³ or more.

13. A sintered magnet that is produced by the method of claim 8 and that has a loop squareness of 95% or more.

14. A rotating machine comprising the sintered magnet of claim 3.

* * * * *